United States Patent
Cho et al.

(10) Patent No.: US 11,348,575 B2
(45) Date of Patent: May 31, 2022

(54) SPEAKER RECOGNITION METHOD AND APPARATUS

(71) Applicant: Samsung Electronics Co., Ltd., Suwon-si (KR)

(72) Inventors: Sung-Jae Cho, Hwaseong-si (KR); Kyuhong Kim, Seoul (KR); Jaejoon Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 8 days.

(21) Appl. No.: 16/898,634

(22) Filed: Jun. 11, 2020

(65) Prior Publication Data

US 2021/0183377 A1 Jun. 17, 2021

(30) Foreign Application Priority Data

Dec. 11, 2019 (KR) ........................ 10-2019-0164841

(51) Int. Cl.
  *G10L 15/20* (2006.01)
  *G10L 15/06* (2013.01)

(52) U.S. Cl.
  CPC ............ *G10L 15/20* (2013.01); *G10L 15/063* (2013.01)

(58) Field of Classification Search
  CPC ............................. G10L 15/20; G10L 15/063
  USPC ....................................................... 704/233
  See application file for complete search history.

(56) References Cited

U.S. PATENT DOCUMENTS

| | | |
|---|---|---|
| 5,913,196 A | 6/1999 | Talmor et al. |
| 10,008,209 B1 | 6/2018 | Qian et al. |
| 10,304,475 B1 | 5/2019 | Wang et al. |
| 2016/0248768 A1 | 8/2016 | McLaren et al. |
| 2018/0075851 A1 | 3/2018 | Schroeter |
| 2018/0308505 A1* | 10/2018 | Chebiyyam ......... G10L 21/0388 |
| 2018/0374486 A1 | 12/2018 | Zhao et al. |
| 2019/0130918 A1 | 5/2019 | Wu et al. |
| 2019/0147890 A1 | 5/2019 | Page et al. |
| 2020/0027472 A1* | 1/2020 | Huang ................ G10L 21/0232 |
| 2020/0168230 A1* | 5/2020 | Roh ........................ G10L 17/00 |

FOREIGN PATENT DOCUMENTS

| | | | |
|---|---|---|---|
| JP | 2008-233759 A | 10/2008 | |
| JP | WO-2014103099 A1 * | 1/2017 | |
| KR | 10-1805437 B1 | 12/2017 | |
| WO | WO-2014103099 A1 * | 7/2014 | ............. G10L 15/28 |
| WO | WO 2018/213746 A1 | 11/2018 | |

OTHER PUBLICATIONS

S. P. Todkar, S. S. Babar, R. U. Ambike, P. B. Suryakarand J. R. Prasad, "Speaker Recognition Techniques: A Review," 2018 3rd International Conference for Convergence in Technology (I2CT), 2018, pp. 1-5, doi: 10.1109/I2CT.2018.8529519. (Year: 2018).*

* cited by examiner

*Primary Examiner* — Bharatkumar S Shah
(74) *Attorney, Agent, or Firm* — NSIP Law

(57) ABSTRACT

A speaker recognition method and apparatus receives a first voice signal of a speaker, generates a second voice signal by enhancing the first voice signal through speech enhancement, generates a multi-channel voice signal by associating the first voice signal with the second voice signal, and recognizes the speaker based on the multi-channel voice signal.

19 Claims, 11 Drawing Sheets

SPEAKER RECOGNITION METHOD AND APPARATUS

CROSS-REFERENCE TO RELATED APPLICATIONS

This application claims the benefit under 35 USC § 119(a) of Korean Patent Application No. 10-2019-0164841 filed on Dec. 11, 2019, in the Korean Intellectual Property Office, the entire disclosure of which is incorporated herein by reference for all purposes.

BACKGROUND

1. Field

The following description relates to a method and apparatus for recognizing a speaker.

2. Description of Related Art

Speaker recognition is a technology for verifying an identity of a speaker through a voice of the speaker and is applicable to various fields of application that use verification or authentication through a voice of a speaker, for example, a mobile terminal, an artificial intelligence (AI) speaker, a home appliance, and the like. To authenticate a speaker through a voice of the speaker, there is a desire for a speaker recognition method that is robust against noise and makes full use of limited voice information of the speaker.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speaker recognition method includes receiving a first voice signal of a speaker, generating a second voice signal by enhancing the first voice signal through speech enhancement, generating a multi-channel voice signal by associating the first voice signal with the second voice signal, and recognizing the speaker based on the multi-channel voice signal.

The generating of the second voice signal may include one or both of enhancing the first voice signal by removing a noise signal estimated from the first voice signal, and enhancing the first voice signal by increasing energy corresponding to a voice of the speaker detected from the first voice signal.

The enhancing of the first voice signal by removing the noise signal may include at least one of removing the noise signal by performing stationary noise suppression through minimum pooling on the first voice signal, removing the noise signal through channel normalization on the first voice signal, and removing the noise signal through sound source separation on the first voice signal.

The generating of the multi-channel voice signal may include extracting a first feature vector including first voice information of the speaker from the first voice signal, extracting a second feature vector including second voice information of the speaker from the second voice signal, and generating the multi-channel voice signal by associating the first feature vector with the second feature vector.

The extracting of the first feature vector may include extracting a variable-length first feature vector from the first voice signal, and extracting a fixed-length first feature vector including the first voice information of the speaker from the variable-length first feature vector.

The extracting of the fixed-length first feature vector may include extracting the fixed-length first feature vector corresponding to a neural network that is trained to recognize the speaker from the variable-length first feature vector.

The extracting of the second feature vector may include extracting a variable-length second feature vector from the second voice signal, and extracting a fixed-length second feature vector including the second voice information of the speaker from the variable-length second feature vector.

The extracting of the variable-length second feature vector may include extracting the variable-length second feature vector using one or both of a feature extraction method based on a spectrum of the second voice signal, and a feature extraction method based on a neural network configured to extract a valid voice frequency interval based on a sync function of the second voice signal.

The extracting of the fixed-length second feature vector may include extracting the fixed-length second feature vector corresponding to a neural network that is trained to recognize the speaker from the variable-length second feature vector.

The extracting of the fixed-length second feature vector may include extracting the fixed-length second feature vector using a K-top pooling method that extracts a feature of a voice signal based on energy for frames for each timeslot of the second voice signal.

The multi-channel voice signal may correspond to a same utterance point as the first voice signal and the second voice signal, and include a same dimension as the first voice signal and the second voice signal.

The speaker recognition method may further include determining whether to use multiple channels. The generating of the second voice signal may include generating the second voice signal based on a first determination of whether to use the multiple channels.

The determining of whether to use the multiple channels may include determining whether to use the multiple channels based on at least one of an operational load and a response speed according to a requirement of a speaker recognition apparatus, a magnitude of stationary noise included in the first voice signal, and a voice volume of the speaker corresponding to the first voice signal.

The generating of the multi-channel voice signal may include generating the multi-channel voice signal based on a second determination of whether to use the multiple channels.

The generating of the multi-channel voice signal may include determining a number of the multiple channels, and generating the multi-channel voice signal by associating the first voice signal with the second voice signal based on the determined number of the multiple channels.

The determining of the number of the multiple channels may include determining the number of the multiple channels based on one or both of a feature of the first voice signal and noise at a location at which the first voice signal is uttered.

The feature of the first voice signal may include at least one of the magnitude of the stationary noise included in the first voice signal, the voice volume of the speaker corresponding to the first voice signal, and a magnitude of additive noise corresponding to the first voice signal.

The recognizing of the speaker may include outputting a third feature vector corresponding to the speaker by applying the multi-channel voice signal to a neural network, calculating a similarity score based on a result of comparing the third feature vector and a registered feature vector of the speaker, and recognizing the speaker based on the similarity score.

The receiving of the first voice signal may include collecting the first voice signal through a voice signal collector including a microphone.

In another general aspect, a speaker recognition apparatus includes a microphone configured to collect a first voice signal of a speaker, and a processor configured to generate a second voice signal by enhancing the first voice signal through speech enhancement, generate a multi-channel voice signal by associating the first voice signal with the second voice signal, and recognize the speaker based on the multi-channel voice signal.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
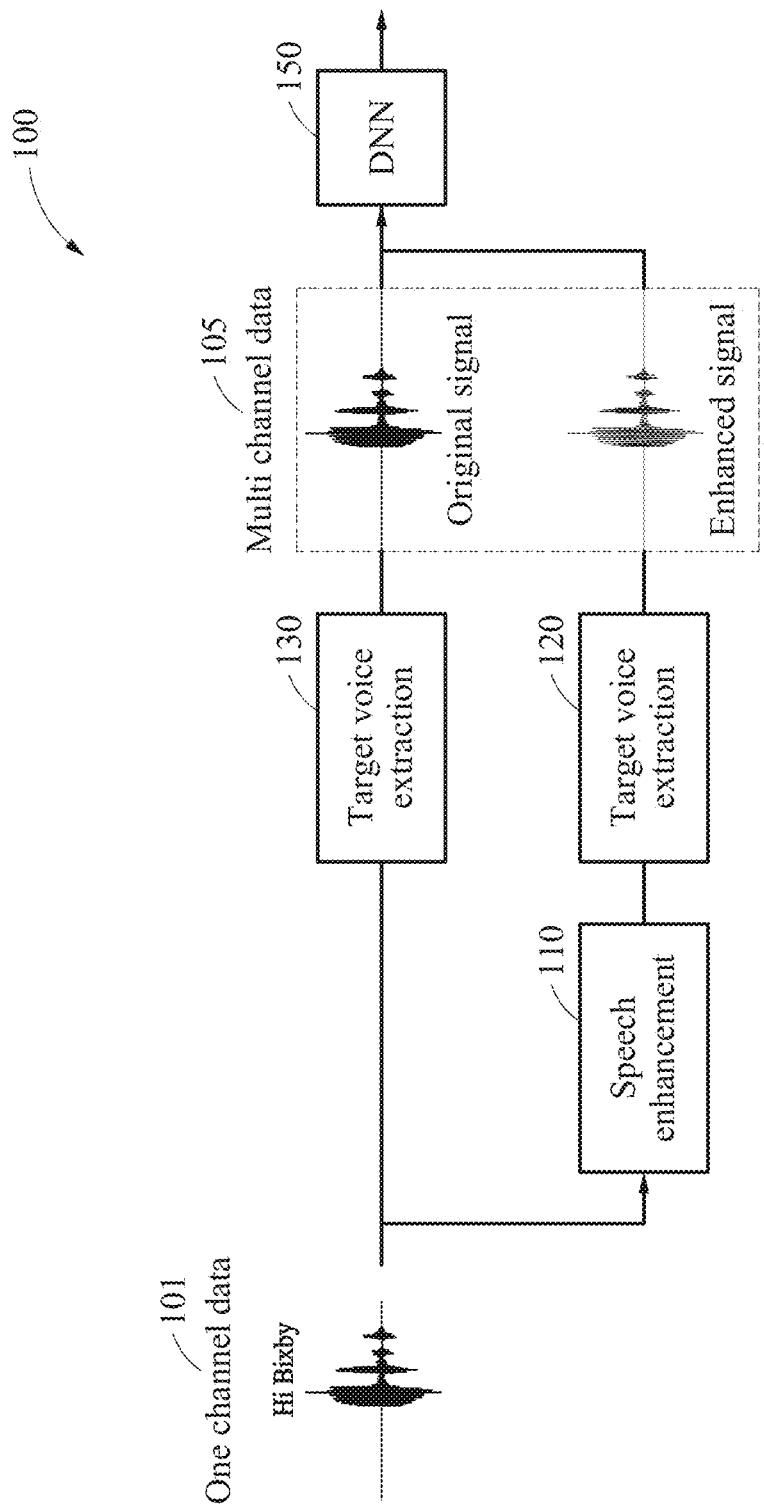
FIG. 1 is a diagram illustrating an example of a speaker recognition method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

The various examples to be described hereinafter may be embodied in various forms of products, for example, a personal computer (PC), a laptop computer, a tablet PC, a smartphone, a television (TV), a smart home appliance, an intelligent vehicle, a kiosk, and a wearable device. For example, various examples may be applicable to speaker authentication or verification based on speaker recognition that is used in, for example, a smartphone, a mobile device, and a smart home system. In addition, the various examples may be applicable to various control operations, such as, for example, performing a payment service, an unlock operation, and an operation customized for a speaker, through speaker recognition. Hereinafter, the examples will be described in detail with reference to the accompanying drawings. Like reference numerals in the drawings denote like elements.

FIG. 1 is a diagram illustrating an example of a speaker recognition method.

For example, in a case of speaker recognition using a neural network, it may recognize a speaker by applying, to the neural network, a single channel voice signal such as an original voice signal or a voice signal enhanced from the original voice signal. In this example, when a single channel original voice signal is applied to the neural network, it may not be easy to extract a feature corresponding to voice information of the speaker due to a noise signal included in the original voice signal. In addition, when a single channel voice signal enhanced from the original voice signal is applied to the neural network, it may be possible to lose the voice information in a recognition process.

Referring to FIG. 1, illustrated are an original voice signal 101 of a speaker, a multi-channel voice signal 105, a speech enhancer 110, target voice extractors 120 and 130, and a deep neural network (DNN) 150.

A speaker recognition apparatus 100, which is an apparatus for recognizing a speaker, may receive the original voice signal 101. The original voice signal 101 may be a voice signal that is collected through various voice signal collectors, such as, for example, a microphone and a voice sensor. The original voice signal 101 may include voice information or utterance information of the speaker, which may be divided by various units, for example, an utterance, a window, and a frame. For example, one frame may be defined as including voice information corresponding to 100 milliseconds (msec) or 10 msec, for example.

The speaker recognition apparatus 100 may generate an enhanced voice signal by enhancing the original voice signal 101 through speech enhancement performed by the speech enhancer 110. The speaker recognition apparatus 100 may apply the generated enhanced voice signal to the target voice extractor 120, and apply the original voice signal 101 to the target voice extractor 130 to extract voice information of the speaker. The speaker recognition apparatus 100 may generate the multi-channel voice signal 105 using the voice information of the speaker that is extracted from each of the original voice signal 101 and the enhanced voice signal output from the speech enhancer 110. The speaker recognition apparatus 100 may recognize the speaker by applying the multi-channel voice signal 105 to the DNN 150. Although the DNN 150 which is one type of neural network is described herein, examples are not limited to a DNN, and other various neural networks, for example, a convolutional neural network (CNN) and a recurrent neural network (RNN), may also be used for speaker recognition.

The generated multi-channel voice signal 105 may include both voice information of the original voice signal 101 and voice information of the enhanced voice signal, and it is thus possible to recognize the speaker by extracting a feature corresponding to the voice information, robustly against noise without a loss of an original signal.

The speaker recognition apparatus 100 may recognize a speaker by extracting a feature vector from a voice signal of the speaker and comparing the extracted feature vector and a registered feature vector stored in a registration database (DB). The speech recognition apparatus 100 may be embodied by a software module, a hardware module, or a combination thereof, for example. The speaker recognition apparatus 100 may generate or process an operation, a calculation, an instruction, and the like that are associated with speaker recognition. The speaker recognition apparatus 100 may be provided or embedded in various computing apparatuses and/or systems, for example, a smartphone, a tablet computer, a laptop computer, a desktop computer, a TV, a wearable device, a security device, and a smart home appliance. A detailed configuration and operation of the speaker recognition apparatus 100 will be described hereinafter.

Figure 2:
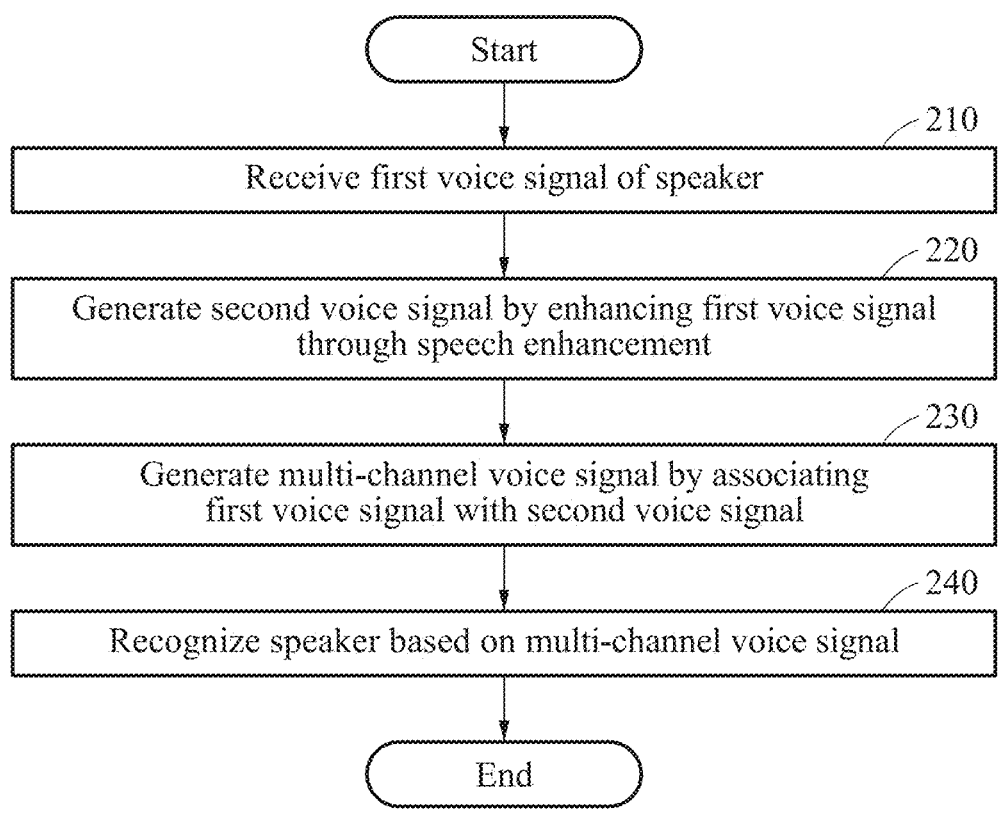
FIG. 2 is a flowchart illustrating an example of a speaker recognition method.

FIG. 2 is a flowchart illustrating an example of a speaker recognition method. Referring to FIG. 2, in operation 210, a speaker recognition apparatus receives a first voice signal of a speaker. The speaker recognition apparatus may receive the first voice signal that is collected by various voice signal collectors such as, for example, a microphone 1110 illustrated in FIG. 11 and a voice detection sensor.

In operation 220, the speaker recognition apparatus generates a second voice signal by enhancing the first voice signal through speech enhancement. The speech enhancement used herein may be construed as enhancing a quality of a voice signal using various algorithms to remove noise, reduce noise, and increase energy of voice information, for example. Hereinafter, the first voice signal is construed as an original voice signal collected from the speaker, and the second voice signal is construed as a voice signal enhanced or reconstructed from the original voice signal through various speech enhancement methods.

For example, the speaker recognition apparatus may enhance the first voice signal by removing a noise signal estimated from the first voice signal. Alternatively, the speaker recognition apparatus may enhance the first voice signal by increasing energy corresponding to a voice of the speaker that is detected from the first voice signal. A detailed method of generating the second voice signal by the speaker recognition apparatus will be described hereinafter with reference to FIGS. 4 and 5.

In operation 230, the speaker recognition apparatus generates a multi-channel voice signal by associating the first voice signal with the second voice signal. The term "associating the first voice signal with the second voice signal" used herein may be construed as encompassing all the following: concatenating the first voice signal and the second voice signal, calculating a sum of elements included in an one-dimensional (1D) vector of each of the first voice signal and the second voice signal through a bit-wise operation, and calculating a weighted sum or a statistical value of the elements included in the 1D vector of each of the first voice signal and the second voice signal.

In operation 230, the speaker recognition apparatus extracts a first feature vector including voice information of the speaker from the first voice signal, and extracts a second feature vector including voice information of the speaker from the second voice signal. A detailed method of extracting the first feature vector and the second feature vector by the speaker recognition apparatus will be described hereinafter with reference to FIGS. 6 through 8. In addition, the speaker recognition apparatus generates the multi-channel voice signal by associating the first feature vector with the second feature vector. A detailed method of generating the multi-channel voice signal by associating the first feature vector with the second feature vector by the speaker recognition apparatus will be described hereinafter with reference to FIG. 9.

In an example, the multi-channel voice signal may correspond to a same utterance point as the first voice signal and the second voice signal, and include a same dimension as the first voice signal and the second voice signal.

In operation 240, the speaker recognition apparatus recognizes the speaker based on the multi-channel voice signal. A detailed method of recognizing the speaker based on the multi-channel voice signal by the speaker recognition apparatus will be described hereinafter. For example, the speaker recognition apparatus may output a third feature vector corresponding to the speaker by applying the multi-channel voice signal to a neural network. In this example, the speaker recognition apparatus may calculate a similarity score based on a result of comparing the third feature vector and a registered feature vector of the speaker. The speaker recognition apparatus may recognize the speaker based on the similarity score. For example, when the similarity score is greater than or equal to a preset threshold value, the speaker recognition apparatus may recognize or authenticate the speaker by recognizing that a corresponding voice signal corresponds to the speaker. In an example, the similarity score may be obtained in a form of a matching score or a distance score. The matching score may be a score indicating a similarity between feature vectors, for example, a similarity between the third feature vector and the registered feature vector. Thus, a low matching score may indicate that the feature vectors are relatively less similar to each other, and a high matching score may indicate that the feature vectors are relatively highly similar to each other. In addition, the distance score may be a score indicating a feature distance, for example, a Euclidean distance, between feature vectors, for example, a feature distance between the third feature vector and the registered feature vector. Thus, a low distance score may indicate that the feature vectors are relatively close to each other in terms of feature distance in a feature vector space, and a high distance score may indicate that the feature vectors are relatively remote from each other in terms of feature distance in the feature vector space.

According to an example, the speaker recognition apparatus may determine the number of multiple channels to be used for speaker recognition, and generate the multi-channel voice signal by associating the first voice signal and the second voice signal based on the determined number of the multiple channels. For example, the speaker recognition apparatus may determine the number of the multiple channels based on a feature of the first voice signal and noise at a location at which the first voice signal is uttered. The feature of the first voice signal may include, for example, a magnitude of stationary noise included in the first voice signal, a voice volume of the speaker corresponding to the first voice signal, and a magnitude of additive noise corresponding to the first voice signal. The additive noise may be noise that occurs additionally by the addition of noise when the noise is added to the first voice signal. For example, when the association between a voice signal and noise is recognized, for example, fading, the addition of the additive noise may be multiplicative.

According to an example, the speaker recognition apparatus may determine whether to configure multiple channels by a diversified method of combining various units or components (or modules as used herein) or sub-units or sub-components (or sub-modules as used herein) to be described hereinafter based on the determined number of the multiple channels.

Figure 3:
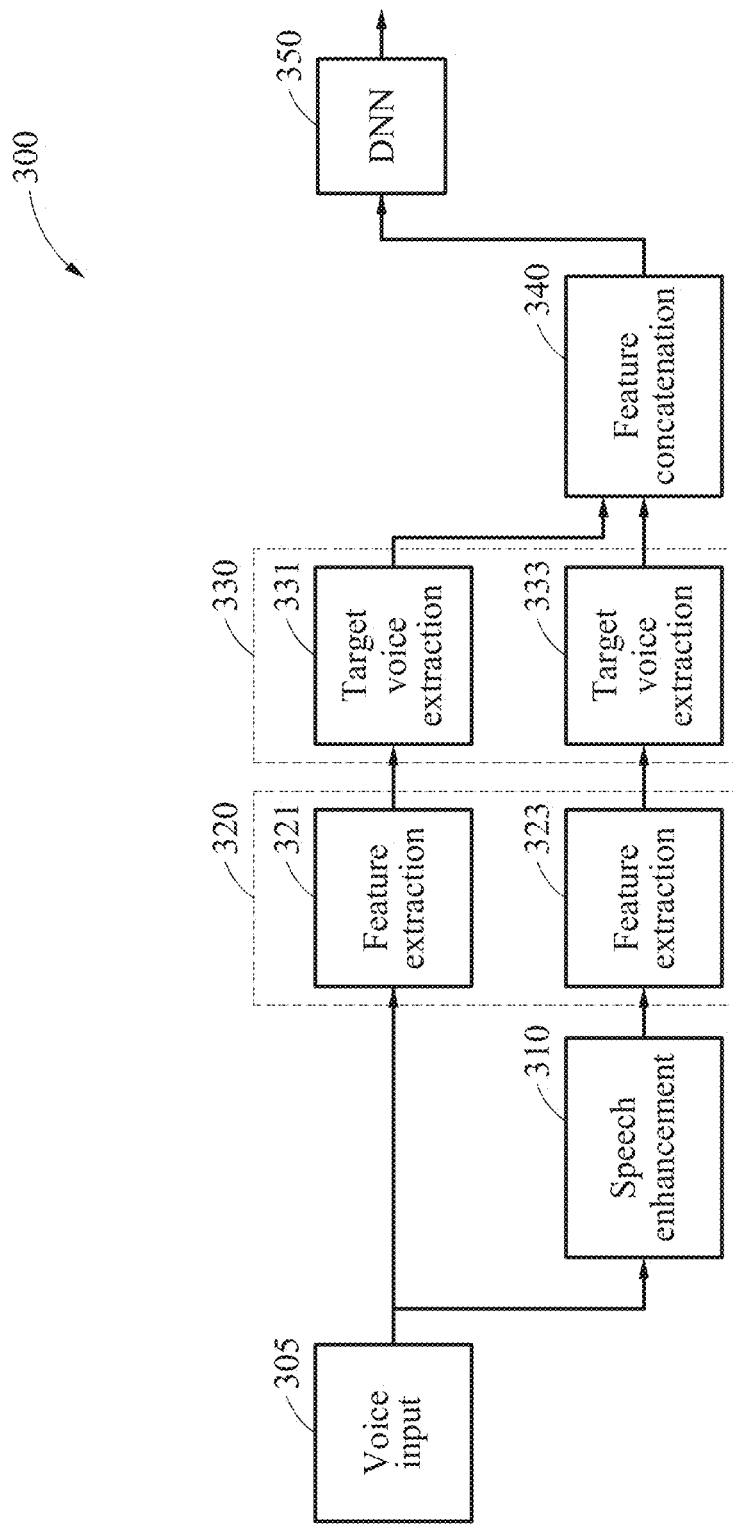
FIGS. 3, 4, 5, 6, 7, 8, and 9 are diagrams illustrating examples of a configuration and an operation of a speaker recognition apparatus.

FIG. 3 is a diagram illustrating an example of a configuration of a speaker recognition apparatus. Referring to FIG. 3, a speaker recognition apparatus 300 includes a speech enhancer 310, a feature extractor 320, a target voice extractor 330, a feature concatenator 340, and a DNN 350. Respective operations of the speech enhancer 310, the feature extractor 320, the target voice extractor 330, the feature concatenator 340, and the DNN 350 may be performed or implemented by a processor 1130 to be described hereinafter with reference to FIG. 11. The feature extractor 320 includes a first feature extractor 321 and a second feature extractor 323. In addition, the target voice extractor 330 includes a first target voice extractor 331 and a second target voice extractor 333.

In the example of FIG. 3, a first voice signal 305 of a speaker is input to the speaker recognition apparatus 300.

The first voice signal 305 is applied to the speech enhancer 310 and the first feature extractor 321.

The speech enhancer 310 generates a second voice signal by enhancing the first voice signal 305 through speech enhancement. The speech enhancer 310 applies the generated second voice signal to the second feature extractor 323. A detailed operation of the speech enhancer 310 will be described hereinafter with reference to FIGS. 4 and 5.

The feature extractor 320 extracts a variable-length feature vector from each of the first voice signal 305 and the second voice signal. The first feature extractor 321 extracts a variable-length first feature vector from the first voice signal 305, and the second feature extractor 323 extracts a variable-length second feature vector from the second voice signal. A detailed operation of the feature extractor 320 will be described hereinafter with reference to FIG. 6.

The target voice extractor 330 extracts a fixed-length first feature vector and a fixed-length second feature vector that include voice information of the speaker respectively from the variable-length first feature vector and the variable-length second feature vector. The first target voice extractor 331 extracts the fixed-length first feature vector including voice information of the speaker from the variable-length first feature vector. The second target voice extractor 333 extracts the fixed-length second feature vector including voice information of the speaker from the variable-length second feature vector. Here, a fixed length used herein may correspond to an input dimension of a neural network, for example, the DNN 350, that is trained to recognize the speaker.

When the first feature vector and the second feature vector including the voice information of the speaker that are output from the target voice extractor 330 are received, the feature concatenator 340 generates a multi-channel voice signal by associating the first feature vector including the voice information of the speaker with the second feature vector including the voice information of the speaker. A detailed operation of the target voice extractor 330 will be described hereinafter with reference to FIGS. 7 and 8.

The generated multi-channel voice signal may include both voice information of the first voice signal 305 which is an original signal, and the second voice signal which is enhanced signal information. Thus, it is applicable when extracting a feature corresponding to voice information of a speaker is not easy due to noise, or it is possible to reduce a probability of a loss of the voice information in a recognition process. In addition, the multi-channel voice signal includes both the voice information of the first voice signal 305 which is an original signal and the second voice signal which is the enhanced signal information, and may thus provide additional information to train the DNN 350 and help improve a level of accuracy of the speaker recognition apparatus 300.

The DNN 350 may be a neural network including a plurality of hidden layers and include, for example, an input layer, at least one hidden layer, and an output layer. The input layer may receive a plurality of frames corresponding to a training voice and transmit the received frames to the hidden layer. The output layer may generate input speaker features which are output data based on a signal received from nodes of the hidden layer. The hidden layer may be between the input layer and the output layer. A training device of the DNN 350 may be configured to convert the frames corresponding to the training voice which is input data to a predictable value through the hidden layer. Nodes included in the input layer and the hidden layer may be connected through a connection line having a connection weight. In addition, nodes included in the hidden layer and the output layer may be connected through a connection line having a connection weight. The hidden layer may be, for example, a convolution filter or a fully-connected layer in a CNN, or various filters or layers classified by a special function or characteristic.

The DNN 350 may be replaced with, for example, a CNN including a convolution layer, a pooling layer, and a fully-connected layer.

The DNN 350 recognizes the speaker based on the multi-channel voice signal. In an example, the DNN 350 may be trained in advance with voice signals collected in 1000 different environments of 100 speakers, for example. To train the DNN 350, a classifier configured to classify a speaker based on an output of the DNN 350 may be used. For example, when ground truth corresponding to the 100 speakers are given in advance as a label, the DNN 350 may be trained with a loss value corresponding to the label to recognize the 100 speakers irrespective of the 1000 different environments.

In an example, the number of multiple channels may be defined or determined based on a system requirement of the speaker recognition apparatus 300. The speaker recognition apparatus 300 may generate a new channel through a combination of modules described above.

In an example, the multi-channel voice signal may be generated or configured in various ways through a combination of the speech enhancer 310, the feature extractor 320, and the target voice extractor 330, or a combination of various methods used by the speech enhancer 310, the feature extractor 320, and the target voice extractor 330. An order by which modules of the speaker recognition apparatus 300, for example, the speech enhancer 310, the feature extractor 320, and the target voice extractor 330, are arranged, or an order by which operations are performed may change based on a method used by each of the modules.

As described, the speaker recognition apparatus 300 may reconstruct a multi-channel voice signal from a single channel original voice signal to improve robustness in speaker recognition. In addition, the speaker recognition apparatus 300 may recognize a speaker using both an original voice signal and an enhanced voice signal to reduce a probability of a signal loss of the original voice signal.

Figure 4:
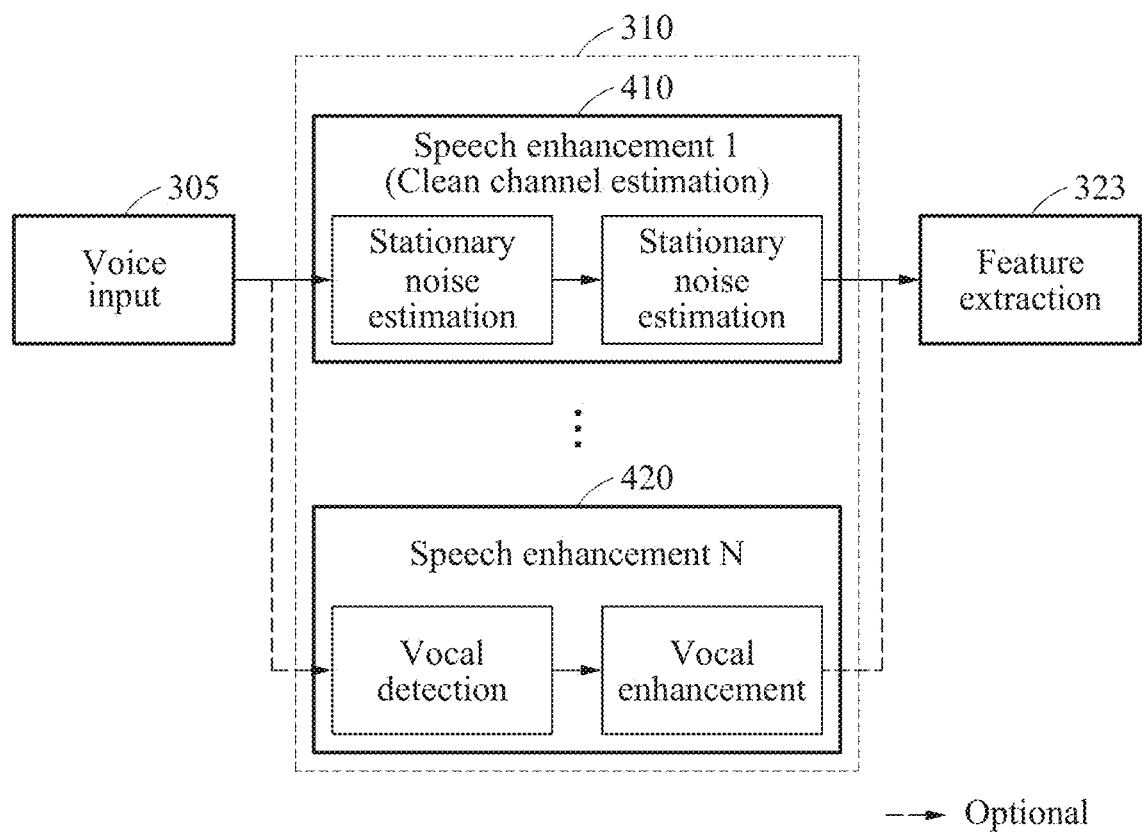

FIG. 4 is a diagram illustrating an example of generating a second voice signal. Referring to FIG. 4, the speech enhancer 310 generates a second voice signal from a first voice signal 305. The speech enhancer 310 may include sub-modules, for example, a first speech enhancer 410 and/or a second speech enhancer 420 as illustrated.

The speech enhancer 310 receives the first voice signal 305 as an input and output the second voice signal by enhancing the received first voice signal 305 through speech enhancement. A method of performing the speech enhancement by the speech enhancer 310 is not limited to a certain method, but various conceivable speech enhancement methods may be used to enhance the first voice signal 305. For example, the speech enhancer 310 may enhance the first voice signal 305 by removing a noise signal estimated from the first voice signal 305. Alternatively, the speech enhancer 310 may remove the noise signal estimated from the first voice signal 305, or remove the noise signal by performing channel normalization on the first voice signal 305. Alternatively, the speech enhancer 310 may remove the noise signal by performing sound source separation on the first voice signal 305.

For example, the first speech enhancer 410 may enhance the first voice signal 305 by removing the noise signal by performing stationary noise suppression through minimum pooling on the first voice signal 305. The stationary noise suppression will be described in detail hereinafter with reference to FIG. 5.

The second speech enhancer 420 may enhance the first voice signal 305 by detecting a voice of a speaker from the first voice signal 305 and increasing energy corresponding to the detected voice of the speaker.

In an example, a speaker recognition apparatus may enhance the first voice signal 305 by using one of sub-modules included in the speech enhancer 310, for example, the first speech enhancer 410 or the second speech enhancer 420, according to a system requirement, or by using a plurality of the sub-modules, for example, the first speech enhancer 410 and the second speech enhancer 420. The second voice signal obtained by the speech enhancer 310 through the speech enhancement is applied as an input to the second feature extractor 323.

In an example, an output format of the speech enhancer 310 may be determined based on methods used for the speech enhancement by the speech enhancer 310, that is sub-modules used for the speech enhancement. For example, the speech enhancer 310 may output the second voice signal in a form of spectrogram or a form of wave based on the sub-modules used for the speech enhancement.

Figure 5:
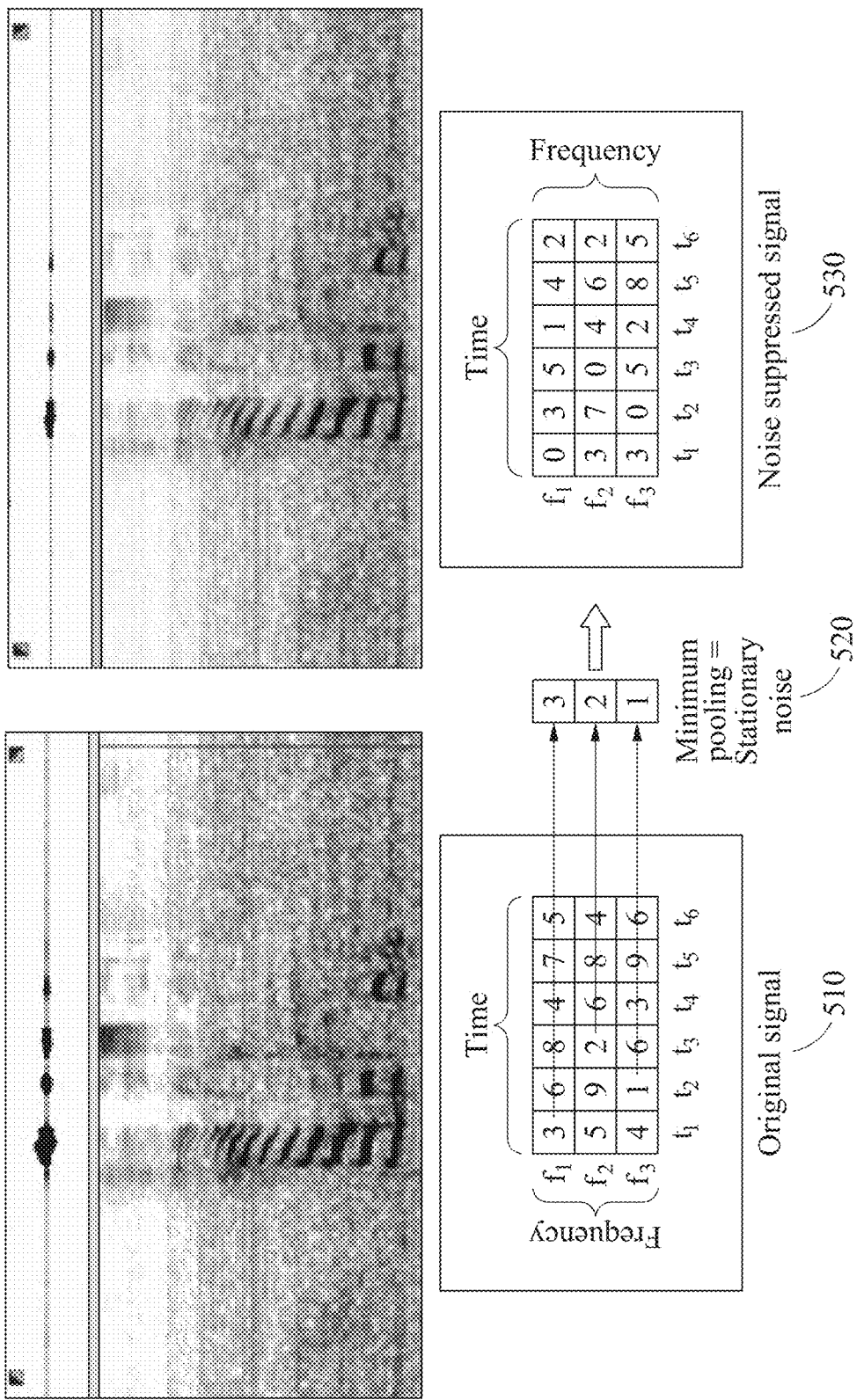

FIG. 5 is a diagram illustrating an example of performing stationary noise suppression. Referring to FIG. 5, the first speech enhancer 410, which is a sub-module of the speech enhancer 310, may perform stationary noise suppression.

The first speech enhancer 410 obtains stationary noise 520 by performing minimum pooling on each frequency bin of a first voice signal 510. In the example of FIG. 5, stationary noise corresponding to a frequency f1 is 3, stationary noise corresponding to a frequency f2 is 2, and stationary noise corresponding to a frequency f3 is 1.

In this example, the first speech enhancer 410 generates a signal 530 from which stationary noise is removed by subtracting the stationary noise 520 from each frequency bin.

Figure 6:
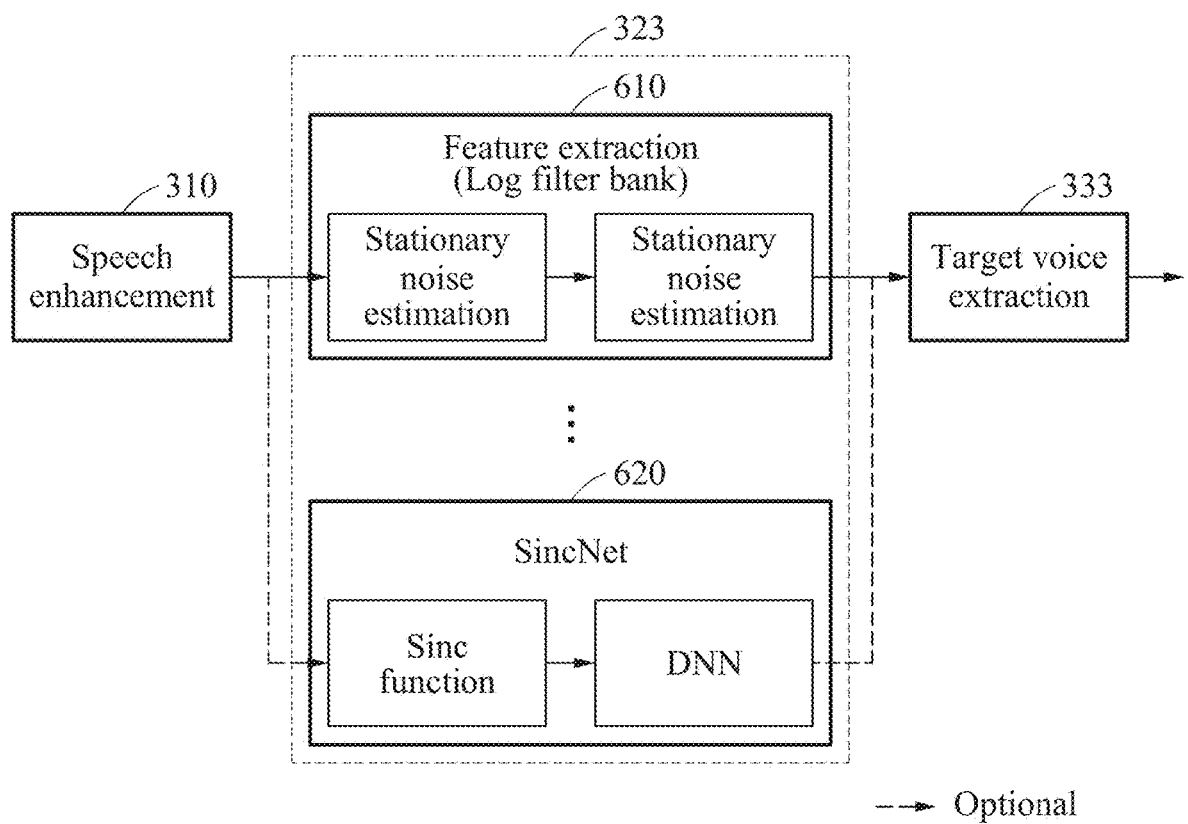

FIG. 6 is a diagram illustrating an example of extracting a feature vector from a voice signal. Referring to FIG. 6, the second feature extractor 323 may extract a variable-length feature vector from a second voice signal received from the speech enhancer 310. Although an operation of the second feature extractor 323 will be described hereinafter for the convenience of description, the first feature extractor 321 configured to receive a first voice signal may also perform the same operation as performed by the second feature extractor 323.

The second feature extractor 323 extracts, from a voice signal, a variable-length feature vector that is suitable to verify a feature or characteristic of a voice of a speaker. For example, the second feature extractor 323 may extract a second feature vector from a second voice signal through a linear predictive coding (LPC) method which is a type of a parameter-based speech synthesis method using a human voice or speech model, a log filter bank method that models after a human auditory organ, or a combination thereof. For example, the log filter bank method may include a Mel-frequency cepstral coefficient (MFCC) method based on a Mel-scale filter bank. For example, in a case of using the combination of such feature extraction methods described in the foregoing, the second feature vector may be extracted from the second voice signal by converting the voice signal based on an MFCC and applying a result of the converting to a neural network.

The second feature extractor 323 may include sub-modules, for example, a 2-1 feature extractor 610 and/or a 2-2 feature extractor 620 as illustrated.

The 2-1 feature extractor 610 may extract the second feature vector from the second voice signal through the log filter bank method that models after a human auditory organ based on a spectrum of the second voice signal. The 2-1 feature extractor 610 may extract the second feature vector through a short-time Fourier transform (STFT) that divides a time interval of the second voice signal and analyzes a frequency within a corresponding time, and through a log function.

The 2-2 feature extractor 620 may extract the second feature vector from the second voice signal using a DNN, for example, SincNet, that is configured to extract a valid voice frequency interval based on a sync function of the second voice signal.

In an example, a speaker recognition apparatus may extract the second feature vector from the second voice signal by using one of sub-modules included in the second feature extractor 323 (e.g., the 2-1 feature extractor 610 or the 2-2 feature extractor 620), or by using a plurality of the sub-modules (e.g., the 2-1 feature extractor 610 and the 2-2 feature extractor 620), according to a system requirement.

An output of the second feature extractor 323 is applied as an input to the second target voice extractor 333.

Figure 7:
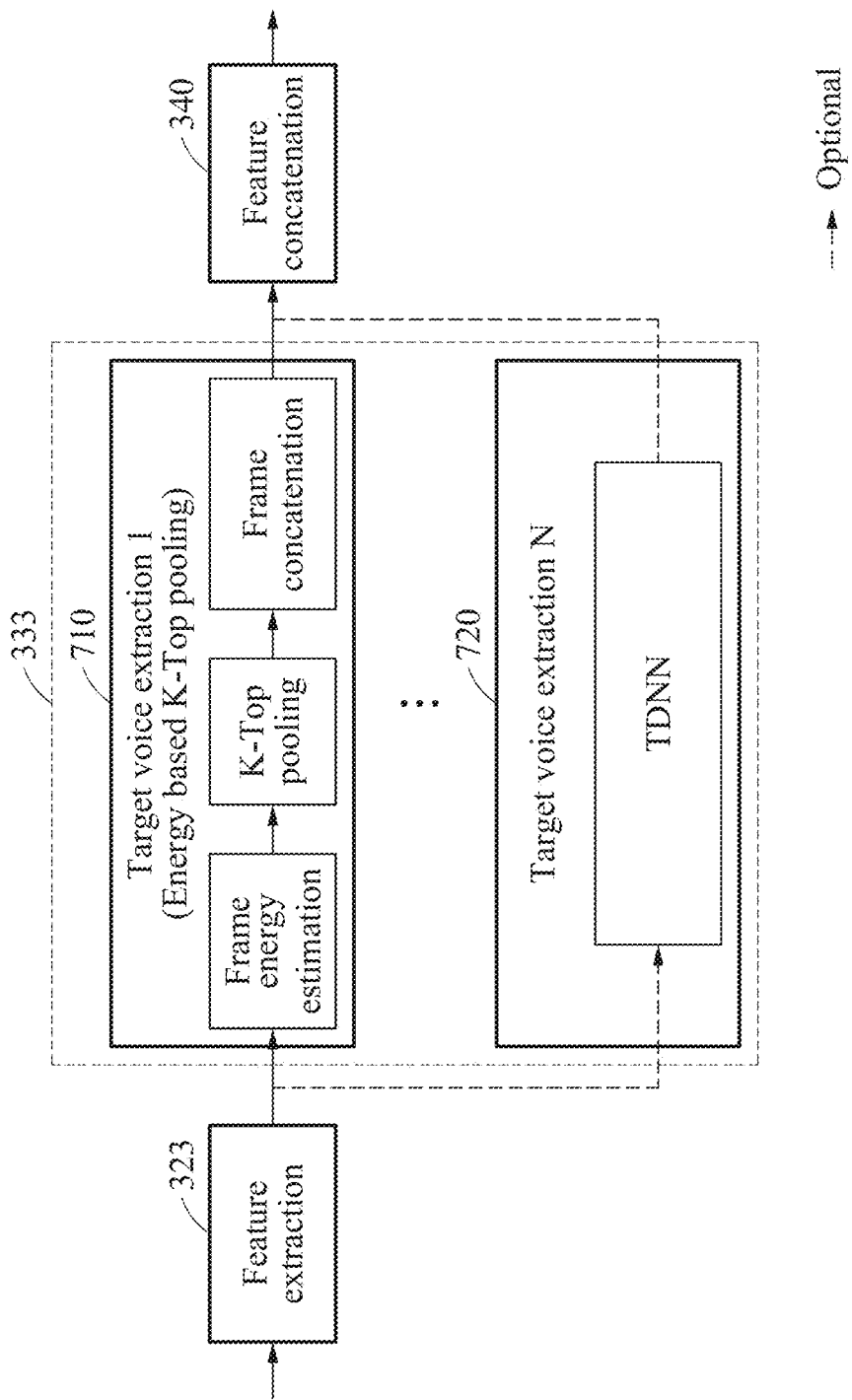

FIG. 7 is a diagram illustrating an example of extracting a feature vector including voice information of a speaker. Referring to FIG. 7, the second target voice extractor 333 may extract a fixed-length second feature vector including voice information of a speaker from a variable-length second feature vector that is output from the second feature extractor 323. Although an operation to be performed by the second target voice extractor 333 to extract a fixed-length second feature vector including voice information of a speaker from a variable-length second feature vector is described for the convenience of description, the first target voice extractor 331 may also perform the same operation as performed by the second target voice extractor 333 to extract a fixed-length first feature vector from a variable-length first feature vector.

In an example, a DNN may receive, as an input, a feature vector of a fixed magnitude. Thus, for the input to the DNN, a variable-length feature vector may need to be converted to a fixed-length feature vector. For example, the second target voice extractor 333 may generate a fixed-length voice signal corresponding to an input of the DNN 350 by converting a variable-length feature vector such that a feature vector of a speaker is applied as an input to the DNN 350. In this example, as much voice information of the speaker as possible may need to be included in a fixed-length feature vector extracted by the second target voice extractor 333.

The second target voice extractor 333 may extract a fixed-length second feature vector including voice information of a speaker from a variable-length second feature vector through a center cropping method, an average pooling method, and a K-top pooling method, for example. The center cropping method may be used to extract the fixed-length second feature vector including the voice information of the speaker by cropping, from the variable-length second feature vector, a central region having a high probability of the voice information of the speaker being included. The average pooling method may be used to extract the fixed-length second feature vector including the voice information of the speaker by taking an average value from a window region of the second feature vector. The K-top pooling method may be used to extract the fixed-length second feature vector based on energy for frames for each timeslot of the second voice signal.

Alternatively, the second target voice extractor 333 may extract the fixed-length second feature vector corresponding to a neural network that is trained to recognize the speaker from the variable-length second feature vector.

The second target voice extractor 333 may include sub-modules, for example, a 2-1 target voice extractor 710 and/or a 2-2 target voice extractor 720 as illustrated.

The 2-1 target voice extractor 710 may extract the second feature vector through the K-top pooling method that extracts a feature of a voice signal based on energy for frames for each timeslot of the second voice signal. The K-top pooling method will be described in detail hereinafter with reference to FIG. 8.

The 2-2 target voice extractor 720 may extract the fixed-length second feature vector including the voice information of the speaker from the variable-length second feature vector using a time-delay neural network (TDNN) of a multi-layer structure that is robust against a time delay of an input voice waveform.

In an example, a speaker recognition apparatus may extract the fixed-length second feature vector from the variable-length second feature vector by using one of sub-modules included in the target voice extractor 330 or the second target voice extractor 333 (e.g., the 2-1 target voice extractor 710 or the 2-2 target voice extractor 720), or by using a plurality of the sub-modules (e.g., the 2-1 target voice extractor 710 and the 2-2 target voice extractor 720).

An output of the second target voice extractor 333 is applied as an input to the feature concatenator 340.

Figure 8:
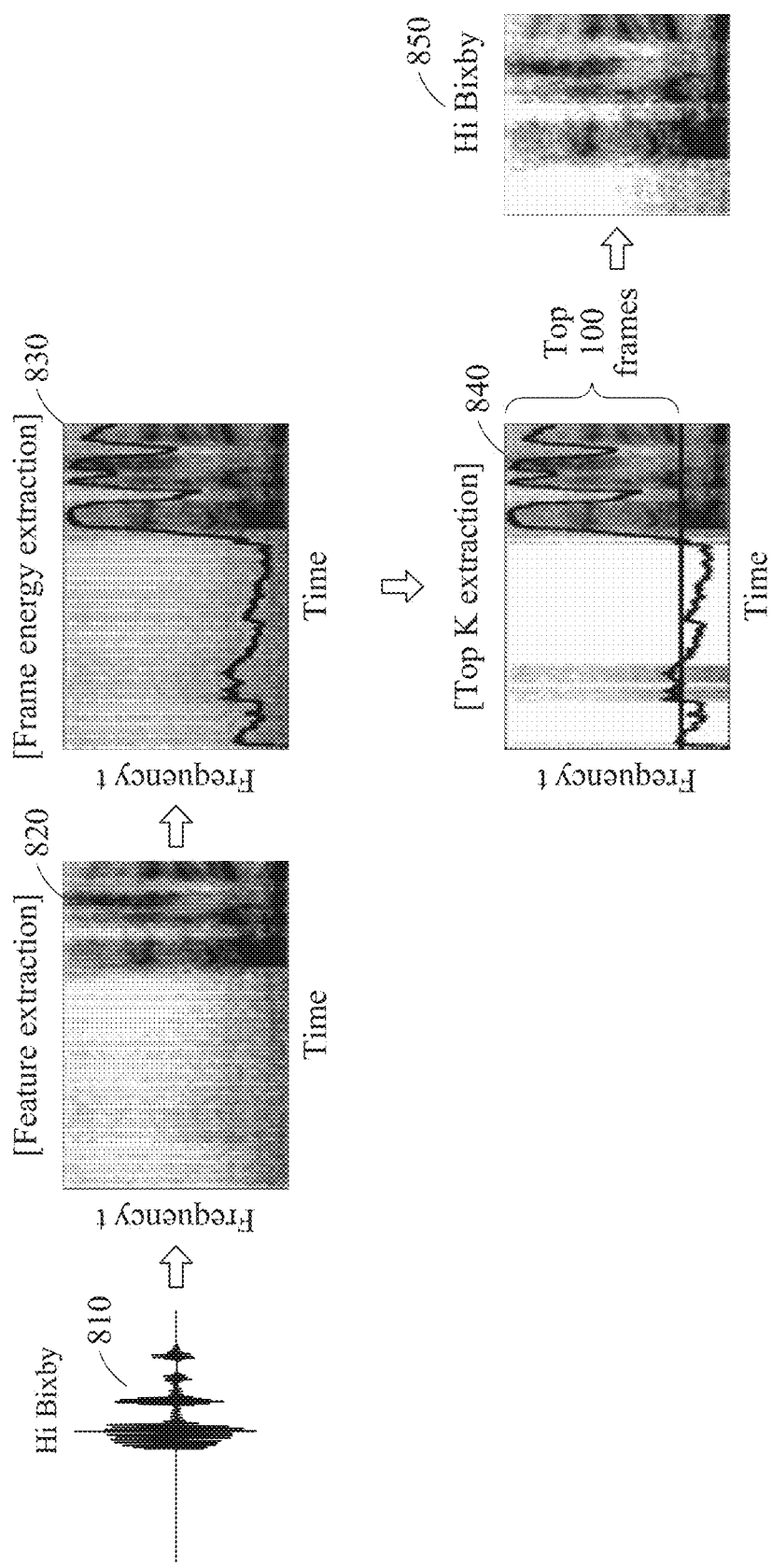

FIG. 8 is a diagram illustrating an example of extracting a feature vector including voice information of a speaker through a K-top pooling method. Referring to FIG. 8, a fixed-length feature vector 850 including voice information of a speaker, for example, "Hi Bixby," may be extracted from a voice signal 810.

The voice information of the speaker may be highly likely to have relatively high energy compared to noise irrespective of an environment where it is used. Thus, average energy may be calculated for each frame, and top K frames may be extracted based on the calculated average energy to extract a frame having a high probability of including the voice information.

In the example of FIG. 8, a target voice extractor extracts a feature vector from frames for each timeslot of the voice signal 810 in operation 820, and estimates or calculates average energy of the extracted feature vector in operation 830. In this example, a speaker recognition apparatus extracts top K frames, for example, 100 frames, based on the average energy in operation 840.

The speaker recognition apparatus generates the fixed-length feature vector 850 for a DNN by concatenating the top K frames.

Figure 9:
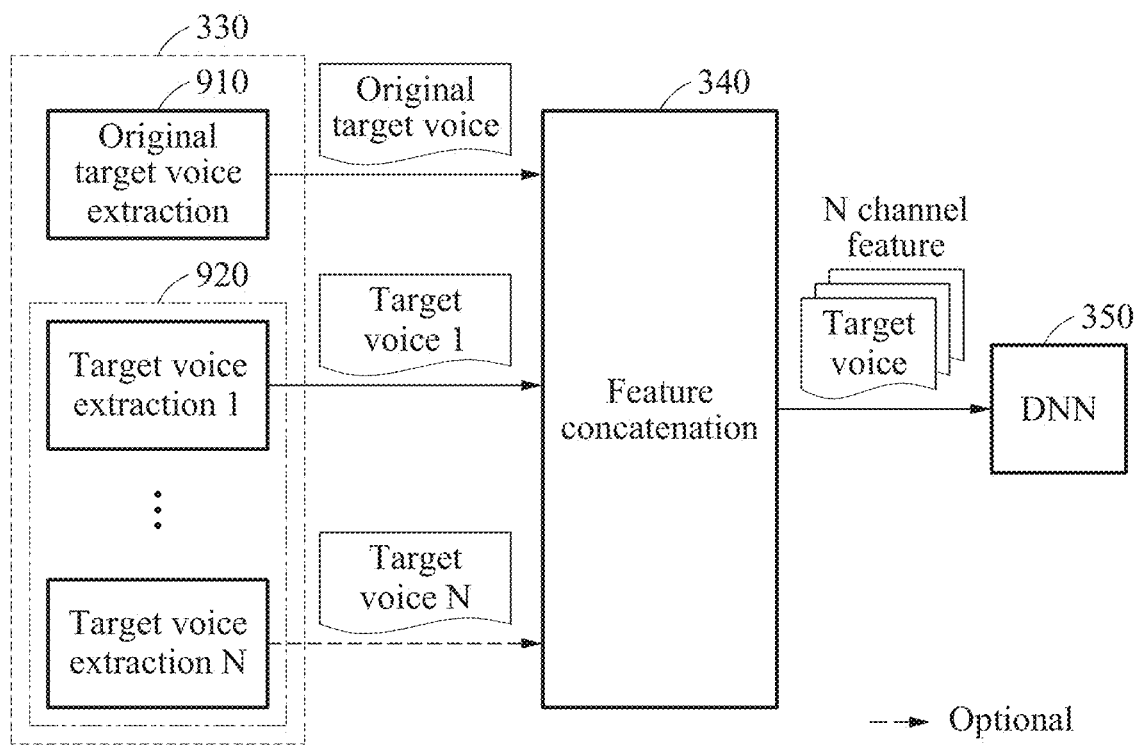

FIG. 9 is a diagram illustrating an example of generating a multi-channel voice signal. Referring to FIG. 9, the feature concatenator 340 may generate a multi-channel voice signal by associating a first voice signal and a second voice signal that are received from the target voice extractor 330 with each other.

The feature concatenator 340 generates a multi-channel voice signal by associating a fixed-length first feature vector 910 and a fixed-length second feature vector 920 that are received from the target voice extractor 330 with each other.

The fixed-length first feature vector 910 may be extracted from a first voice signal. In addition, the fixed-length second feature vector 920 may be extracted from a second voice signal through a combination of various modules. The fixed-length second feature vector 920 may be a single fixed-length second feature vector, or a plurality of fixed-length second feature vectors.

When the feature concatenator 340 configures multiple channels, voice signals may be configured in a same dimension and may thus provide additional information about a same point of the voice signals.

The feature concatenator 340 may configure, as a single input, channels that are generated by the modules described above. The feature concatenator 340 may operate only in a case of configuring multiple channels. Here, whether to configure the multiple channels may be determined by a speaker recognition apparatus according to a system requirement, or by a choice made by a user through a user interface (UI).

An output of the feature concatenator 340 is applied to the DNN 350.

Figure 10:
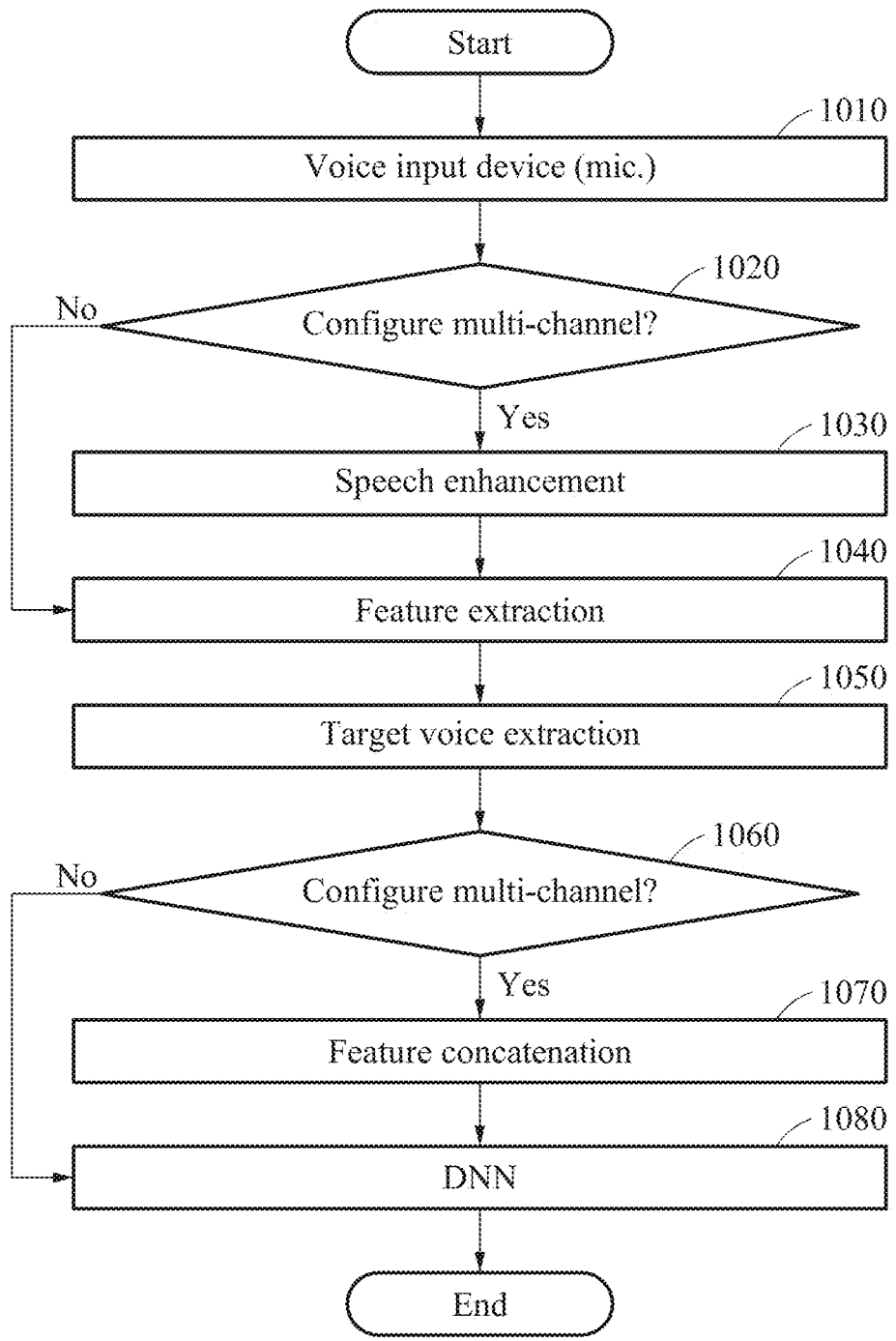
FIG. 10 is a flowchart illustrating another example of a speaker recognition method.

FIG. 10 is a flowchart illustrating another example of a speaker recognition method. Referring to FIG. 10, in operation 1010, a speaker recognition apparatus receives a first voice signal of a speaker through various voice input devices, such as, for example, a microphone.

In operation 1020, when the first voice signal of the speaker is received, the speaker recognition apparatus determines whether to configure multiple channels, that is, whether to generate a multi-channel voice signal. For example, the speaker recognition apparatus may determine whether to configure the multiple channels based on at least one of an operational load and a response speed according to a system requirement of the speaker recognition apparatus, a magnitude of stationary noise included in the first voice signal, or a voice volume of the speaker corresponding to the first voice signal. The speaker recognition apparatus may generate a second voice signal based on whether the multiple channels are to be used or not.

Based on a determination not to configure the multiple channels in operation 1020, the speaker recognition apparatus extracts a variable-length first feature vector from the first voice signal in operation 1040, and extracts a fixed-length first feature vector including voice information of the speaker from the variable-length first feature vector in operation 1050. In operation 1060, the speaker recognition apparatus determines again whether to configure multiple channels. Based on a determination not to configure to the multiple channels in operation 1060, the speaker recognition apparatus recognizes the speaker by applying, to a DNN, the fixed-length first feature vector including the voice information of the speaker in operation 1080.

In contrast, based on a determination to configure the multiple channels in operation 1020, the speaker recognition apparatus generates the second voice signal by enhancing the first voice signal through speech enhancement in operation 1030.

In operation 1040, the speaker recognition apparatus extracts a variable-length first feature vector and a variable-length second feature vector respectively from the first voice signal and the second voice signal. In operation 1050, the speaker recognition apparatus extracts a fixed-length first feature vector and a fixed-length second feature vector that include voice information of the speaker respectively from the variable-length first feature vector and the variable-length second feature vector.

The speaker recognition apparatus may generate a multi-channel voice signal based on whether multiple channels are used or not. In operation 1060, the speaker recognition apparatus determines again whether to configure multiple channels. Based on a determination to configure the multiple channels in operation 1060, the speaker recognition apparatus generates a multi-channel voice signal by associating the first voice signal with the second voice signal in operation 1070.

In operation 1080, the speaker recognition apparatus recognizes the speaker by applying, to the DNN, the fixed-length first feature vector including the voice information of the speaker.

In an example, whether to configure multiple channels may be selectively applicable, and thus a single channel voice signal or a multi-channel voice signal may be selectively applicable to a neural network based on a system requirement of the speaker recognition apparatus, in order to recognize a speaker. Thus, operation 1030 of generating a second voice signal and operation 1070 of generating a multi-channel voice signal may be selectively performed based on whether it is necessary to configure multiple channels.

Figure 11:
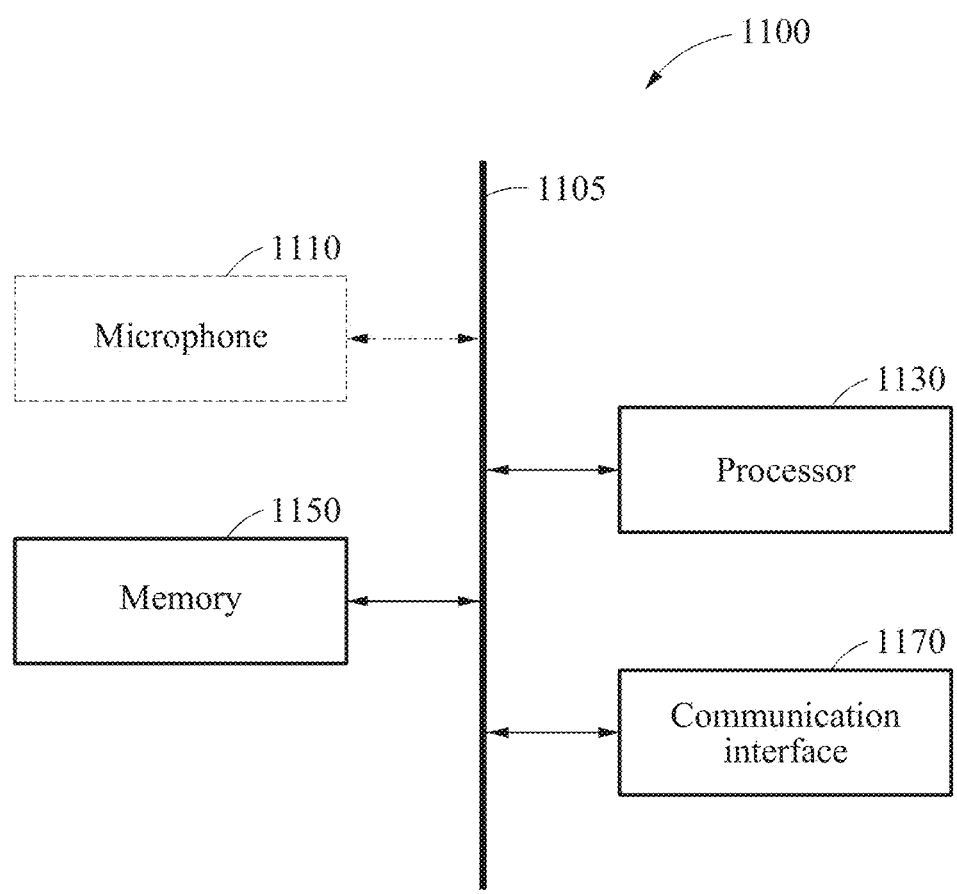
FIG. 11 is a diagram illustrating an example of a speaker recognition apparatus.

FIG. 11 is a diagram illustrating an example of a speaker recognition apparatus.

Referring to FIG. 11, a speaker recognition apparatus 1100 includes the microphone 1110 and the processor 1130. The speaker recognition apparatus 1100 further includes a memory 1150 and a communication interface 1170. The microphone 1110, the processor 1130, the memory 1150, and the communication interface 1170 may communicate with one another through a communication bus 1105.

The microphone 1110 may receive a first voice signal of a speaker. The microphone 1110 may be a condenser microphone, for example. According to an example, the first voice signal of the speaker may be collected by other voice signal collectors, such as, for example, a voice detection sensor, or alternatively be received from an outside of the speaker recognition apparatus 1100 through the communication interface 1170.

The processor 1130 may generate a second voice signal by enhancing the first voice signal through speech enhancement. The processor 1130 may generate a multi-channel voice signal by associating the first voice signal with the second voice signal. The processor 1130 may recognize the speaker based on the generated multi-channel voice signal.

The memory 1150 may store at least one of the first voice signal, the second voice signal, or the multi-channel voice signal. The memory 1150 may store a DB including registered feature vectors of a registered speaker. The memory 1150 may be a volatile or nonvolatile memory.

The communication interface 1170 may receive the first voice signal obtained from the outside of the speaker recognition apparatus 1100. The communication interface 1170 may transmit a result of recognizing the speaker by the processor 1130 to the outside of the speaker recognition apparatus 1100.

The processor 1130 may perform one or more, or all, of the operations or methods described above with reference to FIGS. 1 through 10, and algorithms corresponding to the one or more, or all, of the operations or methods. The processor 1130 may execute a program and control the speaker recognition apparatus 1100. A code of the program to be executed by the processor 1130 may be stored in the memory 1150. The processor 1130 may be embodied by, for example, a central processing unit (CPU), a graphics processing unit (GPU), a neural network processing unit (NPU), or a combination of one or more thereof.

The speaker recognition apparatus, and other apparatuses, devices, units, modules, and components described herein with respect to FIGS. 1, 3, 4, 6, 7, 9, and 11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A speaker recognition method comprising:
receiving a first voice signal of a speaker;
generating a second voice signal by enhancing the first voice signal through speech enhancement;
generating a multi-channel voice signal by associating the first voice signal with the second voice signal; and
recognizing the speaker based on the multi-channel voice signal,
wherein generating the multi-channel voice signal comprises:
extracting, from the first voice signal, a first feature vector including first voice information of the speaker;
extracting, from the second voice signal, a second feature vector including second voice information of the speaker; and
generating the multi-channel voice signal by associating the first feature vector with the second feature vector.

2. The speaker recognition method of claim 1, wherein generating the second voice signal comprises one or both of:
enhancing the first voice signal by removing a noise signal estimated from the first voice signal; and
enhancing the first voice signal by increasing energy corresponding to a voice of the speaker detected from the first voice signal.

3. The speaker recognition method of claim 2, wherein enhancing the first voice signal by removing the noise signal comprises at least one of:
removing the noise signal by performing stationary noise suppression through minimum pooling on the first voice signal;
removing the noise signal through channel normalization on the first voice signal; and
removing the noise signal through sound source separation on the first voice signal.

4. The speaker recognition method of claim 1, wherein extracting the first feature vector comprises:
extracting a variable-length first feature vector from the first voice signal; and
extracting a fixed-length first feature vector including the first voice information of the speaker from the variable-length first feature vector.

5. The speaker recognition method of claim 4, wherein extracting the fixed-length first feature vector comprises:
extracting the fixed-length first feature vector corresponding to a neural network that is trained to recognize the speaker from the variable-length first feature vector.

6. The speaker recognition method of claim 1, wherein extracting the second feature vector comprises:
extracting a variable-length second feature vector from the second voice signal; and
extracting a fixed-length second feature vector including the second voice information of the speaker from the variable-length second feature vector.

7. The speaker recognition method of claim 6, wherein extracting the variable-length second feature vector comprises:
extracting the variable-length second feature vector using one or both of a feature extraction method based on a spectrum of the second voice signal, and a feature extraction method based on a neural network configured to extract a valid voice frequency interval based on a sync function of the second voice signal.

8. The speaker recognition method of claim 6, wherein extracting the fixed-length second feature vector comprises:
extracting the fixed-length second feature vector corresponding to a neural network that is trained to recognize the speaker from the variable-length second feature vector.

9. The speaker recognition method of claim 1, wherein the multi-channel voice signal corresponds to a same utterance point as the first voice signal and the second voice signal, and includes a same dimension as the first voice signal and the second voice signal.

10. The speaker recognition method of claim 1, further comprising:
determining whether to use multiple channels,
wherein generating the second voice signal comprises:
generating the second voice signal based on a first determination of whether to use the multiple channels.

11. The speaker recognition method of claim 10, wherein determining whether to use the multiple channels comprises:
determining whether to use the multiple channels based on at least one of an operational load and a response speed according to a requirement of a speaker recognition apparatus, a magnitude of stationary noise included in the first voice signal, and a voice volume of the speaker corresponding to the first voice signal.

12. The speaker recognition method of claim 10, wherein generating the multi-channel voice signal comprises:
generating the multi-channel voice signal based on a second determination of whether to use the multiple channels.

13. The speaker recognition method of claim 1, wherein generating the multi-channel voice signal comprises:
determining a number of multiple channels; and
generating the multi-channel voice signal by associating the first voice signal with the second voice signal based on the number of the multiple channels.

14. The speaker recognition method of claim 13, wherein determining the number of the multiple channels comprises:
determining the number of the multiple channels based on one or both of a feature of the first voice signal and noise at a location at which the first voice signal is uttered.

15. The speaker recognition method of claim 14, wherein the feature of the first voice signal comprises:
at least one of a magnitude of stationary noise included in the first voice signal, a voice volume of the speaker corresponding to the first voice signal, and a magnitude of additive noise corresponding to the first voice signal.

16. The speaker recognition method of claim 1, wherein receiving the first voice signal comprises:
collecting the first voice signal through a voice signal collector including a microphone.

17. A non-transitory computer-readable storage medium storing instructions that, when executed by a processor, cause the processor to perform the speaker recognition method of claim 1.

18. A speaker recognition method comprising:
receiving a first voice signal of a speaker;
generating a second voice signal by enhancing the first voice signal through speech enhancement;
generating a multi-channel voice signal by associating the first voice signal with the second voice signal; and
recognizing the speaker based on the multi-channel voice signal, wherein recognizing the speaker comprises:

outputting a feature vector corresponding to the speaker by applying the multi-channel voice signal to a neural network;

calculating a similarity score based on a result of comparing the feature vector and a registered feature vector of the speaker; and recognizing the speaker based on the similarity score.

19. A speaker recognition apparatus comprising:

a microphone configured to collect a first voice signal of a speaker; and a processor configured to generate a second voice signal by enhancing the first voice signal through speech enhancement, generate a multi-channel voice signal by associating the first voice signal with the second voice signal, and recognize the speaker based on the multi-channel voice signal, wherein the processor is configured to generate the multi-channel voice signal by extracting, from the first voice signal, a first feature vector including first voice information of the speaker, extracting, from the second voice signal, a second feature vector including second voice information of the speaker, and generating the multi-channel voice signal by associating the first feature vector with the second feature vector.

* * * * *